United States Patent [19]

Dorey

[11] E Re. 28,833

[45] Reissued May 25, 1976

[54] ANALOGUE TO DIGITAL CONVERTER

[75] Inventor: Howard Anthony Dorey, Farnborough, England

[73] Assignee: The Solartron Electronic Group Limited, Farnborough, England

[22] Filed: May 23, 1975

[21] Appl. No.: 580,402

Related U.S. Patent Documents

Reissue of:

[64] Patent No.: 3,745,556
Issued: July 10, 1973
Appl. No.: 141,340
Filed: May 7, 1971

U.S. Applications:

[63] Continuation of Ser. No. 769,588, Oct. 22, 1968, abandoned.

[30] Foreign Application Priority Data

Oct. 25, 1967 United Kingdom..... 48587/67

[52] U.S. Cl...... 340/347 NT; 324/99 D; 340/347 AD

[51] Int. Cl.[2] ..... G01R 17/00; G01R 17/02; H03K 13/02

[58] Field of Search..... 340/347 AD, 347 NT; 324/99 D; 307/235; 328/146, 147, 148, 151

[56] References Cited

UNITED STATES PATENTS

| | | | |
|---|---|---|---|
| 2,824,285 | 2/1958 | Hunt | 340/347 CC |
| 3,056,047 | 9/1962 | Cooke-Yarborough | 340/347 AD |
| 3,258,764 | 6/1966 | Muniz et al. | 340/347 AD |
| 3,287,723 | 11/1966 | Metcalf | 340/347 AD |
| 3,305,856 | 2/1967 | Jenkinson | 340/347 AD |
| 3,419,784 | 12/1968 | Winn | 340/347 AD |
| 3,421,093 | 1/1969 | Hinrichs et al. | 340/347 CC |
| 3,493,961 | 2/1970 | Hansen | 340/347 AD |
| 3,500,109 | 3/1970 | Sugiyama et al. | 340/347 AD |

*Primary Examiner*—Thomas J. Sloyan
*Attorney, Agent, or Firm*—William R. Sherman; Stewart F. Moore; Walter C. Farley

[57] ABSTRACT

In an analogue to digital converter the unknown voltage is applied continuously to an integrating circuit during each conversion period. An opposing reference voltage is switched on and off to cause the amplifier output to ramp up and down between two detection levels. One or both of these levels varies as a periodic function of time, e.g. a sawtooth waveform. Clock pulses are counted when the slope of the output ramp is of one sign only and it is shown that the ratio of the unknown voltage to the reference voltage is simply related to the number of clock pulses actually counted when the slope is of said one sign and the total number of clock pulses occurring during the conversion period.

16 Claims, 4 Drawing Figures

$C_1$
14
15
$V_U$
10
$R_1$
11
$V_0$
$V_1$
$V_2$
12
13
SAWTOOTH GEN.
DELAY
21
$R_2$
16
CLOCK GEN.
17
20
18
SWITCH
GATE
19
0
$-V_R$
COUNTER
RESET

T
0
$V_1$
$V_0$
$V_2$
$t_0$
$t_1$
$t_2$

0
$V_0$
$V_1$
$V_2$ $V_1$
0
$V_0$
$V_2$
S
T

ANALOGUE TO DIGITAL CONVERTER

Matter enclosed in heavy brackets [ ] appears in the original patent but forms no part of this reissue specification; matter printed in italics indicates the additions made by reissue.

*This application is a continuation of application Ser. No. 769,588, filed on Oct. 22, 1968, and now abandoned.*

The invention relates to an analogue to digital converter (ADC) and concerns a converter which converts an analogue quantity to a corresponding digital count, by counting clock pulses during a particular time interval. A use of such converters is as voltmeters.

One well known ADC is the dual ramp type in which the unknown voltage is applied to an integrating amplifier for a fixed period of time defined by a number of clock pulses. The unknown voltage is then removed and a reference current is fed into the amplifier to restore the output to datum. The number of clock pulses counted while the reference current flows is proportional to the unknown voltage. It will be apparent that the total time for a measurement depends upon the magnitude of the unknown voltage. This means that measurements taken cyclically must either be taken at a variable rate, which is frequently undesirable owing to the need to synchronise the operation of the ADC with other equipment, or at a relatively slow fixed rate determined by the cycle time required for measuring a full scale input. There will then normally be wasted waiting time in each cycle and in any case the dual ramp ADC requires the unknown voltage to be applied for the first part only of each cycle. It is frequently desirable to be able to accept the unknown voltage continuously in order for example to overcome transient fluctuations caused by the switching operation. In practice this may obviate the need for a buffer amplifier.

In the specification of U.S. Pat. No. 3,267,458 there is described an ADC which will accept the unknown voltage continuously. To this end, whenever the output of the integrating amplifier exceeds a given threshold level a standard increment of charge is fed into the amplifier in opposition to the current flowing in response to the unknown voltage. The number of such increments counted in a given interval is proportional to the unknown voltage. This ADC is however subject to the disadvantage that a large number of current pulses may have to be switched into the amplifier and counted in some instances. The cumulative switching errors are sometimes substantial and limit the accuracy and resolution of the ADC.

There is also described an ADC in the specification of copending U.S. application Ser. No. 481,853 filed Aug. 23, 1965, now U.S. Pat. No. 3,458,809, issued July 29, 1969, which will operate cyclically and accept a continuous input. The increments of charge are fed in at a standard rate during part only of each cycle, the two parts of the cycle being demarcated by the time at which the amplifier output attains a fixed trigger level. After some such cycles the system stabilizes and the mark to mark-plus-space ratio of each cycle represents the magnitude of the unknown voltage. The ADC illustrated and described in the last said specification is sometimes also subject to the disadvantage of switching large numbers of increments of charge.

In contrast with such prior art the present invention opens up the possibility of an entirely new mode of operation which permits a single measurement to be made in one cycle of predetermined duration and yet only requires a relatively small number of switching operations per cycle.

According to the present invention there is provided an analogue to digital converter comprising an integrating means arranged to integrate first and second opposing electrical signals, of which one is derived from an unknown signal and the other is a reference signal. A bistable device controls the second signal which is integrated by the integrating means in one state only of the bistable device, while the first signal is integrated continuously, at least during the course of a measurement cycle. Level detection means are responsive to and arranged to detect two distinct levels of the output signal of the integrating means and so control the bistable device that, when the output signal reaches one level the bistable device is switched to its one state, whereupon the output signal returns towards the other detection level and when it reaches the other detection level the bistable device is switched to its other state and the output signal returns towards the said one level. The converter further comprises means for applying a variable waveform signal to the level detection means to cause at least one of the levels detected thereby to vary, and means for counting clock pulses while the bistable device is in one only of its two states. The means for applying a variable waveform signal may be merely a switch to cause the levels detected by the level detector to switch from one discrete level to another, or it may be a more complex circuit for causing the level to vary in some predetermined manner with time.

Assuming that a continuous measurement is required the signal derived from the unknown signal will be the first, continuously integrated signal and the reference signal will be switched by the bistable, (although the converse situation is theoretically usable).

Preferably one of the detection levels or both such levels vary in a continuous, rather than a stepwise, manner. This gives rise to two distinct modes of operation, determined by whether the two levels converge or diverge. In the divergent mode it is desirable that the, or each, detection level varies periodically. Otherwise the stabilization over several cycles may not take place. In the convergent mode cyclic operation is not essential, but is usually desirable. In either mode it will normally be necessary to have the two levels converge to or diverge from a condition of equality and in ordinary applications both levels will be linear functions of time (which includes the case where one level is constant).

It can always be arranged that there is a free portion at the beginning of a cycle before the counter is called upon to start counting clock pulses and this free portion can be used to display or read out the count attained during the preceding cycle. The cycles can thus follow each other immediately with completely continuous monitoring of an unknown voltage.

These various features and advantages will be better understood from the following more detailed description, given by way of example, with reference to the accompanying drawings, in which.

Figure 1:
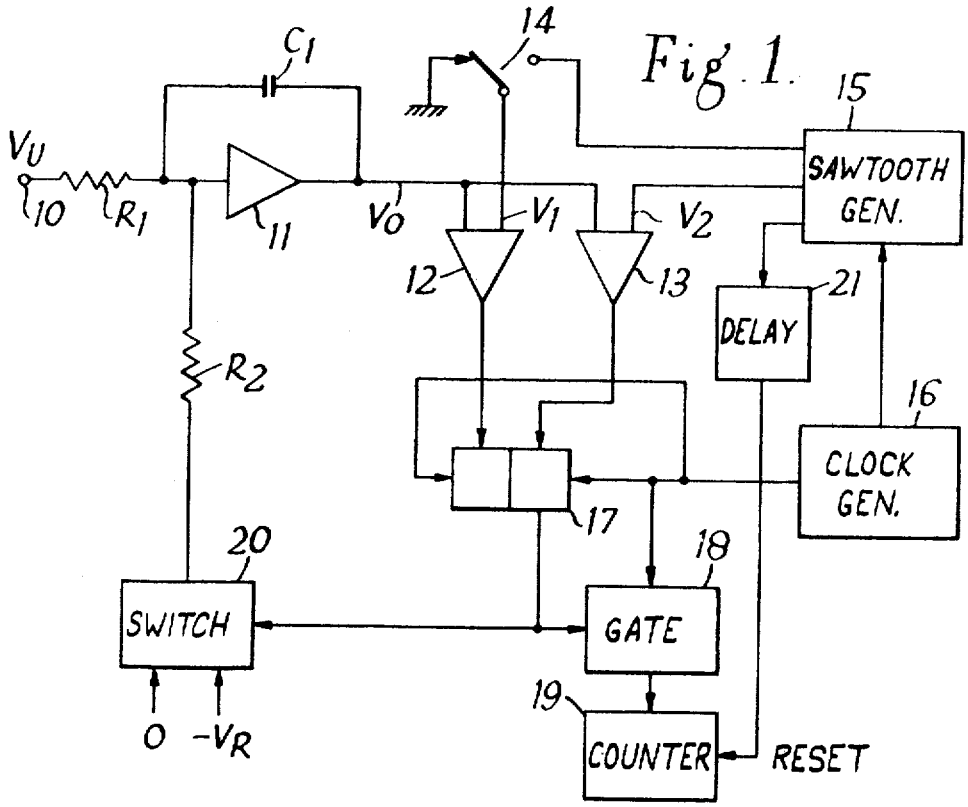
FIG. 1 is a block diagram of one embodiment of the invention.

In FIG. 1 the unknown voltage $V_U$ applied to a terminal 10 feeds current continuously through a resistor $R_1$ nto an integrating operational amplifier 11 having a 'eedback capacitor $C_1$. The output $V_0$ of the amplifier s applied to two level detectors 12 and 13 in the form of differential amplifiers supplied with detection level voltages $V_1$ and $V_2$ respectively. In the illustrated position of switch 14 $V_1$ is at zero volts. $V_2$ is supplied by a sawtooth generator 15 synchronised to a clock pulse generator 16. The number of clock pulses in one sawtooth period is large, say 10,000 or more.

Outputs from the detectors 12 and 13 switch a bistable device 17 alternately to its two states, the switching instants being strobed by the clock pulses. The first and second states of the bistable device will be defined as those two stable states to which the bistable switches in response to $V_0$ attaining $V_1$ and $V_2$ respectively. In the second state only a gate 18 is opened and the clock pulses pass to a counter 19. Also while the bistable 17 is in the second state, a switch 20, e.g. a transistor switch, is operated to apply a reference voltage $-V_R$ of opposite polarity to the input voltage $V_U$ to a resistor $R_2$ through which a reference current then flows into the amplifier 11. In the first state of the bistable 17 the switch 20 is so operated that zero volts is applied to $R_2$ and hence no current flows through $R_2$.

Figure 2:
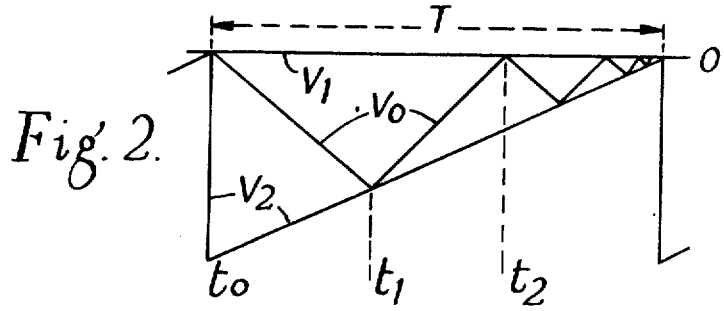
FIG. 2 shows voltage waveforms illustrating operation in the convergent mode.

The mode of operation will be apparent from FIG. 2. At the beginning $t_0$ of each cycle the sawtooth $V_2$ resets to a negative value and then returns linearly to zero volts, $V_0$ falls linearly at a rate proportional to $V_U$ and when $V_0$ reaches $V_2$ at $t_1$ the bistable 17 switches to its second state on receipt of the next clock pulse, so switching $-V_R$ to $R_2$. $V_R/R_2$ is arranged to be larger than $V_U/R_1$ for $V_U$ full scale and therefore $V_0$ now rises towards $V_1$, reaching $V_1$ at $t_2$ when the bistable switches back to its first state. This procedure continues until the end of the cycle but the reference current only has to be switched a few times, typically 10 to 20 and switching errors are not significant. All cycles are identical.

If $s_1 = t_1 - t_0$ and $s_2 = t_2 - t_1$ it is apparent that $s_2/s_1 = V_U/(V_R - V_U)$, assuming that $R_1 = R_2$. Therefore:

$$s_2/(s_1 + s_2) = V_U/V_R.$$

But all triangles of the waveform $V_0$ are geometrically similar, and it accordingly follows that $$S/T = V_U/V_R$$

where S is the total length of all the intervals such as $t_1$ to $t_2$ in which the bistable is in its second state and T is the period of the complete cycle determined by the period of the generator 15 (and hence ultimately by the clock generator 16).

Hence $$V_U = S \cdot V_R/T.$$

$V_R$ and T are known quantities and S is given by the count in the counter 19. S can be left in the counter for display or readout until $t_1$ is reached in the next cycle. The minimum value for $t_1$ corresponding to the full scale value for $V_U$ can be determined and the counter 19 is reset within this minimum value, for example as shown off the flyback of $V_2$ via a delay device 21. Part of this free time at the beginning of the cycle can be used for synchronising the generator 15. It is obviously not desirable to do this by frequency division right down from clock frequency to sawtooth frequency. Instead the clock can be counted down to a frequency which is an integral multiple of that of the generator 15 and the output of a comparator be used to pull the generator frequency in known manner.

Figure 3:
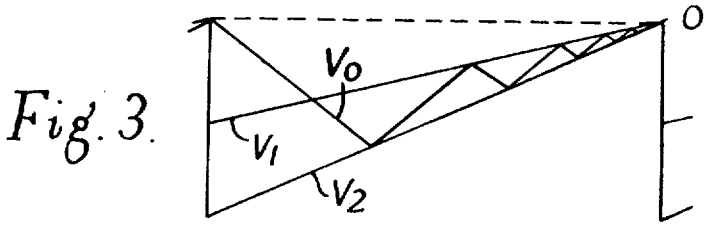
FIG. 3 shows voltage waveforms illustrating operaion in the convergent mode with both detection levels 'arying.

In accordance with another embodiment of the present invention, $V_1$ does not remain at zero volts but is obtained from the generator 15 by operating the switch 14 to couple an output of the generator 15 to the $V_1$ input of the comparator 12. $V_1$ has the same period and form as $V_2$ but is of smaller amplitude as shown in FIG. 3, being derived, for example, from $V_1$ by way of a resistive potentiometer in the generator 15. As before, the bistable 17 switches to its first and second states when $V_0$ reaches $V_1$ and $V_2$ respectively. This modification has the advantage that the relative slopes of $V_1$ and $V_2$ can be so adjusted that, if the circuit is designed to measure a positive voltage, any fluctuating voltage whose mean value is positive with respect to ground potential can be accepted even though there is only a single counter 19. In known voltmeters it is necessary to count pulses representing positive and negative portions of the input respectively in a differential manner (see for example the prior specification first mentioned above) unless other precautions are taken, which may lead to errors, such as introducing a full scale offset or using input changeover relays.

However, referring again to FIG. 3 the initial value of $V_2$ is made sufficiently large that, if a positive full scale voltage $V_u$ acted for the whole of T, $-V_R$ will only just be able to return $V_0$ to zero by opposing (and outweighing) $V_u$ for the whole of the interval commencing when $V_0$ first reaches $V_2$ and terminating at the end of T. On the other hand the initial value of $V_1$ is made such that the slope of $V_1$ corresponds to the slope of $V_0$ obtained when a negative full scale voltage $V_u$ is operative alone, i.e., not in conjunction with $-V_R$.

Given these conditions, so long as $V_0$ reaches $V_2$ the mean value of $V_U$ must be positive and all pulses occuring while the bistable is in its second state have the same sense of numerical significance. Thus, even if $V_U$ switched to its full scale negative value immediately after $V_0$ has reached $V_2$ and remained at this value for the whole of the rest of the cycle $V_0$ could not reach zero volts after $V_1$ reaches zero volts, i.e., until the end of T. If $V_U$ is negative or its mean value is negative $V_0$ will never reach $V_2$ and the circuit will simply not read.

If bipolar inputs are to be accepted one of the well known techniques may be adopted, such as the use of a full scale offset or duplication of the level detectors 12 and 13, one pair for each polarity, each pair with its associated bistable for controlling $-V_R$ and another reference voltage, not shown, of magnitude equal to $-V_R$ but of opposite polarity. Note the counter 19 need not be duplicated since only one bistable will ever be operated and the single counter can record magnitude with polarity indicated from the bistable which switches to its second state.

Figure 4:
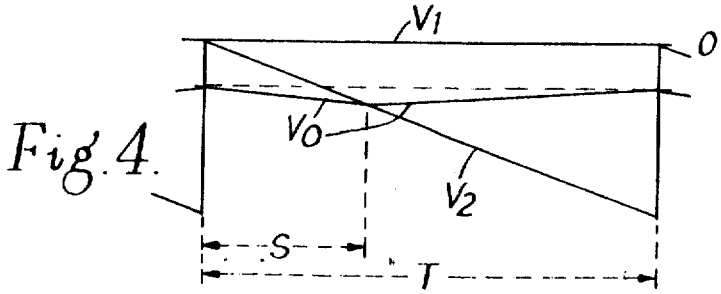
FIG. 4 shows voltage waveforms illustrating operaion in the divergent mode.

FIG. 4 illustrates one cycle in the divergent mode of operation. The circuit remains as in FIG. 1 with the switch 14 set to give $V_1$ a constant value of zero. The generator 15 is designed to provide in well known manner a sawtooth which ramps away from zero instead of towards zero as in FIG. 2. In the divergent mode a few cycles of operation are necessary to stabilize the operation of the converter. Stabilization occurs when, as illustrated by FIG. 4, $V_0$ has the same value at the end of the cycle as at the beginning. The fact that the circuit will tend quite rapidly to this stable condition can be shown along the lines of the analysis appearing in the prior specification mentioned secondly above. Once the stable condition is reached a single cycle of period T only is needed for the measurement, $V_\ell$ being given in terms of S/T as denoted on FIG. 4, S being measured while $-V_R$ is connected.

An advantage of this embodiment of the invention is that the waveform $V_2$ can be derived by the generator 15 from the mains supply voltage so as to ensure that $V_\ell$ is integrated over one or an integral number of exact mains periods in order to eliminate mains jitter from the reading. It will then be desirable to synchronise the clock generator 16 with the mains driven generator 15, in a manner known to those skilled in the art, rather than vice versa.

Four cycles of operation may suffice to reach the stable condition. For example, the generator can run at 200 Hz. (i.e. four times mains frequency of 50 Hz) giving a 5 m S period to each cycle and a total measurement time of 20 m S. In the first and second cycles the gate 18 can be kept closed so that clock pulses do not pass from the generator 16 to the counter 19 and the counter 19 is not cleared at the beginning of the first cycle. Hence in the first cycle the counter displays the reading obtained in the previous measurement. In the second cycle the generators 15 and 16 are synchronised, for example counting up from zero to half full house and then synchronising the phases of the generators. In the third and fourth cycles the circuit functions as heretofore described to gate clock pulses into the counter so as to measure S. The details given in this paragraph are also applicable to the convergent mode of operation.

Obviously many modifications can be made to the embodiments described. The clock pulses could be counted when the bistable is in its first state instead of the second. The clock frequency need not be kept constant. For example, to increase accuracy a lower frequency can be used at the end of the cycle with compensating stepwise adjustment of one of the detection levels and appropriate modification of the counter so as to count each pulse with the correct significance or weighting pertaining thereto. One detection level or each of the two levels may be switched between two discrete levels, rather than varying linearly with time as described, or the output of the generator 15 may be arranged to be a staircase waveform, i.e. $V_2$ or $V_1$ and $V_2$ would be a staircase approximation to a linear waveform.

Although continuous feedback is preferable through $R_2$ in the relevant state of the bistable 17, to minimise switching transient errors, the feedback can take the form, (well known in itself), of a succession of pulses. These are only indicative of some of the possibilities for modification.

What is claimed is:

1. An ADC comprising in combination: integrating means having an input and an output, means for applying a first electrical signal continuously throughout a measurement period to the input of said integrating means, a circuit means having two states for applying a second electrical signal opposing said first signal to the integrating means input when in one of said two states, said integrating means being responsive to the application of said first and second signals to produce an output signal at the integrating means output which ramps up and down during said measurement period as the states of said circuit means alternate, level detection means responsive to two different levels of said output signal to cause said circuit to switch alternatively to the two states thereof when the said two levels are respectively reached by said output signal, signal generator means for applying a variable waveform signal to said level detection means to cause at least one of said detection levels to vary in accordance with a predetermined function independent of the magnitude of said first electrical signal, and a clock pulse generator and counter means for counting clock pulses from said clock pulse generator while said circuit means is in one of said two states, whereby the pulses counted by said counter means are representative of the magnitude of the first electrical signal.

2. An ADC according to claim 1, wherein said signal generator means cause one of said detection levels to vary as a periodic function of time.

3. An ADC according to claim 1, wherein said signal generator means cause both said detection levels to vary as co-periodic functions of time.

4. An ADC according to claim 1, wherein said signal generator means cause at least one of said detection levels to vary as a periodic, linear function of time.

5. An ADC according to claim 1, wherein said signal generator means cause at least one of said detection levels to vary as a periodic function of time which is periodically equal in amplitude to the other detection level.

6. An ADC according to claim 5, wherein said signal generator means cause said two detection levels to converge continuously throughout each period and to diverge from equality abruptly at the transition from one period to the next.

7. An ADC according to claim 6, wherein at least one of said detection levels follows a linear sawtooth waveform.

8. An ADC according to claim 5, wherein said signal generator means cause said two detection levels to diverge continuously throughout each period and to converge to equality abruptly at the transition from one period to the next.

9. An ADC according to claim 8, wherein at least one of said detection levels follows a linear sawtooth waveform.

10. An ADC according to claim 1, wherein said signal generator means operate periodically to cause at least one of said detection levels to vary as a periodic function of time, and wherein said signal generator means and said clock pulse generator are synchronized.

11. An ADC according to claim 1, wherein said signal generator means operate periodically to cause at least one of said detection levels to vary as a periodic function of time and to reset said counter means to zero once in every period.

12. An ADC according to claim 11, wherein it is arranged that each period commences with an interval in which said circuit means having two states is in that state in which clock pulses are not counted and wherein said counter means is reset during this interval but a sufficient time after the beginning of the period to allow the count accumulated in the previous period to be displayed or read out.

13. An ADC comprising in combination: integrating means having an input and an output, level detection means responsive to and arranged to detect first and second distinct levels of an output signal at the integrating means output, a bistable device controlled by said level detection means to assume first and second states when said first and second levels are respectively attained by said output signal, means for applying an unknown electrical signal continuously throughout a measurement period to the integrating means input to cause said output signal to move from said second level to said first level when said unknown signal is the only signal applied to said input, a source of a reference signal opposing said unknown signal and responsive to the state of said bistable device to apply said reference signal to said integrating means input only while said bistable device is in said first state to cause said output signal to move from said first level to said second level, a clock pulse generator and a counter controlled by said bistable device to count clock pulses only while said bistable device is in said first state, a periodic sawtooth generator for generating waveforms of substantially sawtooth shape independent of the magnitude of said unknown signal, said periodic sawtooth generator being synchronized to said clock pulse generator such that the sawtooth waveform period at least equals a plurality of clock pulse periods, at least one of said first and second levels being provided as a sawtooth function by said sawtooth generator, whereby the total of the pulses counted by said counter when said bistable device is in said first state is representative of the magnitude of said unknown electrical signal.

14. An ADC according to claim 13, comprising means for resetting said counter to a predetermined count a predetermined interval of time after the beginning of each sawtooth period while said bistable device is still in said second state.

15. An ADC according to claim 13, wherein both said detection levels are provided as sawtooth functions of different amplitude by said sawtooth generator, said functions converging to equality during each sawtooth period and diverging on flyback of the sawtooth generator.

16. An analog to digital converter comprising integrating means; means for applying an input signal to said integrating means to be integrated; first means for establishing a first reference level and for producing a first control signal when the integrated input signal reaches said first reference level; second means for establishing a second reference level for producing a second control signal when the integrated input signal reaches said second reference level; means for causing at least one of said first and second reference levels to periodically vary in magnitude independent of the magnitude of said input signal; means responsive to one of said first and second control signals for including, with said input signal as an input to said integrator, a known signal component of a polarity and magnitude to cause the integrated signal to reverse its slope, and to the other of said first and second signals for removing said known signal component; and means for measuring the intervals of time during which said known signal component is being integrated within an integral number of periods of variation of said at least one reference level, whereby the intervals of time measured by said means for measuring are representative of the magnitude of said input signal.

* * * * *